(12) United States Patent
Montgelard (10) Patent No.: US 12,279,720 B2
(45) Date of Patent: Apr. 22, 2025

(54) REMOVABLE HANDLE WITH REINFORCED SUPPORT MEMBER

(71) Applicant: SEB S.A., Ecully (FR)

(72) Inventor: Michel Montgelard, Aix-les-Bains (FR)

(73) Assignee: SEB S.A. (FR)

( * ) Notice: Subject to any disclaimer, the term of this patent is extended or adjusted under 35 U.S.C. 154(b) by 806 days.

(21) Appl. No.: 17/543,879

(22) Filed: Dec. 7, 2021

(65) Prior Publication Data

US 2022/0211217 A1    Jul. 7, 2022

(30) Foreign Application Priority Data

Jan. 7, 2021   (FR) ....................................... 2100140

(51) Int. Cl.
*A47J 45/07*   (2006.01)

(52) U.S. Cl.
CPC .................................. *A47J 45/071* (2013.01)

(58) Field of Classification Search
CPC ........... A47J 45/071; A47J 45/07; A47J 27/00
USPC ......................................... 294/31.1, 34, 27.1
See application file for complete search history.

(56) References Cited

U.S. PATENT DOCUMENTS

| | | | | |
|---|---|---|---|---|
| 6,000,100 | A * | 12/1999 | Montgelard ............. | A47J 45/10 220/759 |
| 7,883,129 | B2 * | 2/2011 | Jung ........................ | A47J 45/10 220/759 |
| 8,235,245 | B2 * | 8/2012 | Lorthioir .................. | A47J 45/10 220/759 |
| 11,607,081 | B2 * | 3/2023 | Munari ................... | A47J 45/071 |
| 2006/0081136 | A1 * | 4/2006 | Lorthioir ................. | A47J 45/10 99/584 |
| 2006/0096996 | A1 * | 5/2006 | Lorthioir ................. | A47J 45/10 220/759 |
| 2010/0007158 | A1 | 1/2010 | Jung et al. | |

(Continued)

FOREIGN PATENT DOCUMENTS

| | | |
|---|---|---|
| EP | 1523266 B1 | 11/2007 |
| EP | 3319497 B1 | 5/2019 |

OTHER PUBLICATIONS

French Search Report for Application No. 2100140 dated Sep. 23, 2021, pp. 1-2.

*Primary Examiner* — Paul T Chin

(74) *Attorney, Agent, or Firm* — Lerner David LLP (57) ABSTRACT

The invention relates to a removable handle intended to cooperate with a cooking container having a side wall that is extended upwards by a outwardly-curved portion comprising a free end, said removable handle extending in a longitudinal direction and comprising an internal support member and an external support member intended to come against, respectively, an interior surface and an exterior surface of the side wall, said removable handle comprising a plastic gripping body that extends in the longitudinal direction and which comprises a front end provided with the external support member.

According to the invention, the gripping body comprises a metal reinforcement attached to the front end and provided with a tab that extends at the support member, the metal reinforcement and the tab being dimensioned to guarantee the geometry of the removable handle assembly cooking container in the event of thermal degradation of the plastic material of the front end of the gripping body.

14 Claims, 9 Drawing Sheets

(56) References Cited

U.S. PATENT DOCUMENTS

| | | | | |
|---|---|---|---|---|
| 2014/0158701 A1* | 6/2014 | Bonnel | ................ | A47J 45/071 |
| | | | | 220/759 |
| 2020/0245819 A1* | 8/2020 | Besche | ................ | A47J 45/071 |
| 2021/0298543 A1* | 9/2021 | Greene | ................ | A47K 17/022 |
| 2022/0211218 A1* | 7/2022 | Bouvet | ................ | A47J 45/071 |

* cited by examiner

REMOVABLE HANDLE WITH REINFORCED SUPPORT MEMBER

CROSS-REFERENCE TO RELATED APPLICATIONS

This application claims priority from French application number 2100140, filed Jan. 7, 2021, the disclosure of which is hereby incorporated herein by reference.

TECHNICAL FIELD

This invention relates to a removable handle designed to cooperate with a cooking container, said cooking container, such as a saucepan, a frying pan or a stewpot, having a side wall that is extended upwards by an outwardly-curved portion.

STATE OF THE ART

Document EP1523266 discloses a removable handle designed to cooperate with a cooking container having a side wall that is extended upwards by an outwardly-curved portion comprising a free end. The removable handle extends in a longitudinal direction and comprises an inner supporting member and an external support member designed to rest against, respectively, an interior surface and an exterior surface of the side wall. The removable handle has a plastic gripping body that extends longitudinally and has a front end equipped with the external support member.

However, in the event of misuse, especially on a gas fire, the plastic material of the external support member may be burned by the flame of the gas fire. Thus, the geometry of the external support member is modified and the correct assembly of the removable handle on the cooking container is no longer guaranteed. As a result, the cooking container could become detached from the removable handle in case of strong stresses. The removable handle can include a metal part arranged on a lower exterior surface of the front end that acts as a flame guard. However, the external support member may be thermally degraded, and the metal part is not dimensioned to compensate for this degradation.

SUMMARY OF THE INVENTION

The present invention is intended to remedy these disadvantages.

The technical problem at the basis of the invention consists of proposing a removable handle that enables safe and reliable operation over time.

Another purpose of the invention is to propose a removable handle intended to cooperate with a cooking vessel of a design that is simple and economical to use.

To this end, a subject matter of the invention is a removable handle intended to cooperate with a cooking container having a side wall that is extended upwards by a outwardly-curved portion comprising a free end, said removable handle extending in a longitudinal direction and comprising an internal support member and an external support member intended to come against, respectively, an interior surface and an exterior surface of the side wall, said removable handle comprising a plastic gripping body which extends longitudinally and which comprises a front end equipped with the external support member, characterized in that the gripping body comprises a metal reinforcement attached to the front end and provided with a tab that extends at the external support member, the metal reinforcement and the tab being dimensioned to guarantee the geometry of the removable handle/cooking container assembly in the event of thermal degradation of the plastic material at the front end of the gripping body.

By a tab that extends at the support member, it is understood that the support member is formed in part by the front end and in part by the tab.

Advantageously, the front end forming the support member and the tab are aligned to be in contact with the exterior surface of the side wall of the cooking container.

With the metal reinforcement and the tab being dimensioned to guarantee the geometry of the removable handle/container assembly in the event of thermal degradation of the plastic material of the front end of the gripping body, it is understood that the metal reinforcement and the tab have a rigidity that guarantees the geometry of the removable handle/container assembly in the event of thermal degradation of the plastic material of the front end of the gripping body.

As the metal reinforcement and the tab are dimensioned to guarantee the geometry of the removable handle/container assembly, it is understood that if the support member, in particular the plastic part, is degraded by improper use, in particular on a gas fire, the metal reinforcement and the tab are dimensioned so that the tab withstands the stresses against the exterior surface of the side wall during use of the cooking container.

Thus, the metal reinforcement tab ensures an identical and stable position of the external support member over time even in the event of thermal degradation of the plastic material of the front end of the gripping body.

Advantageously, the front end has a front face with a lower portion and the lower portion of the front face has a cavity to receive the tab.

Thus, the tab and the parts of the lower portion located near the tab form the external support member.

Preferably, the metal reinforcement comprises a vertical plane of symmetry passing through the longitudinal direction, the tab extending on either side of the plane of symmetry.

Thus, the metal reinforcement and the tab are distributed in a balanced manner on either side of the plane of symmetry.

Advantageously, the metal reinforcement is made from a sheet having a thickness greater than 0.6 millimeters, preferably greater than 0.8 millimeters.

Thus, the mechanical strength of the tab and the metal reinforcement is sufficient to guarantee a good hold over time, under any type of conditions of use of the cooking container.

Preferably, the metal reinforcement extends over a lower outer face of the front end of the gripping body.

Thus, the metal reinforcement extends near the tab.

By [sic], the metal reinforcement extends over a lower outer face of the front end of the gripping body, it is understood that the metal reinforcement extends at least partially over a lower outer face of the front end of the gripping body.

Advantageously, the lower outer face of the front end of the gripping body comprises first and second upper ends and the metal reinforcement comprises first and second fasteners arranged at the first and second upper ends.

Thus, the first and second fasteners of the metal reinforcement are arranged on the front end of the gripping body so as to be as far away from the heating device, in particular from the gas fire, in order to be affected as little as possible by overheating.

Preferably, the first and second fasteners are formed by first and second material returns that extend along the longitudinal direction and towards the interior of the gripping body and the first and second upper ends comprise first and second receiving housings of the first and second material returns.

Advantageously, the first and second material returns are arranged in the first and second receiving housings by elastic deformation of the metal reinforcement.

Such an arrangement is particularly economical in terms of material used and assembly time.

Preferably, the metal reinforcement covers mostly the lower outer face of the front end of the gripping body in order to form a flame guard.

Thus, the metal reinforcement performs several functions.

Advantageously, the metal reinforcement is embedded in the front end.

Such a provision makes it possible to improve the maintenance of the metal reinforcement in the front end in the event of stresses on the tab.

Advantageously, the metal reinforcement surrounds the front end of the gripping body.

Preferably, the tab is arranged between a first portion and a second portion of the metal reinforcement.

Thus, the tab is easily held in position by the first portion and the second portion of the metal reinforcement.

Advantageously, the first portion is immobilized on the gripping body by screwing and the second portion comprises a return of material that is embedded in a cavity of the gripping body.

Thus, the second portion provided with the return of material and which extends on a lower outer face of the front end of the gripping body ensures an absorption of the forces transmitted by the tab, when using the cooking container.

Advantageously, the removable handle comprises a structural part which comprises the internal support member and an upper support member intended to come against the free end of the curved portion and in that it comprises a lock movable in translation between an open position and a closed position, the lock comprising a blocking wall intended to be away from the internal support member in the open position of the lock and intended to generate a force on the free end in the closed position of the lock, under the action of a pressurization means.

Preferably, the removable handle comprises means of maneuvering the toggle lock comprising a lever which is mounted movably in rotation on the structural part and on the gripping body, a connecting rod and a compression spring forming the pressurization means.

The spring is pushed on the lock in the longitudinal direction when the lock is in the closed position. This arrangement makes it possible to adapt the position of the lock to the thickness and length of the free end.

The invention also relates to an assembly formed by at least one cooking container comprising a side wall that is extended upwards by an outwardly-curved portion comprising a free end having an upper edge and a lower edge and equipped with a removable handle as described above.

BRIEF DESCRIPTION OF THE FIGURES

The purposes, aspects and advantages of the present invention, according to the description given below of a particular embodiment of the invention presented by way of non-limiting example, will be better understood by referring to the attached drawings in which.

Only those elements required in order to understand the invention have been depicted. In order to facilitate interpretation of the drawings, the same elements are labeled with the same references across all the figures.

It should be noted that in this document, the terms "horizontal", "vertical", "lower", "upper", "top", "bottom", "front", "rear", "longitudinal", and "transverse", used to describe the removable handle, refer to this removable handle when positioned for use, when it is fitted onto a cooking container that is resting flat on a work surface.

Figure 1:
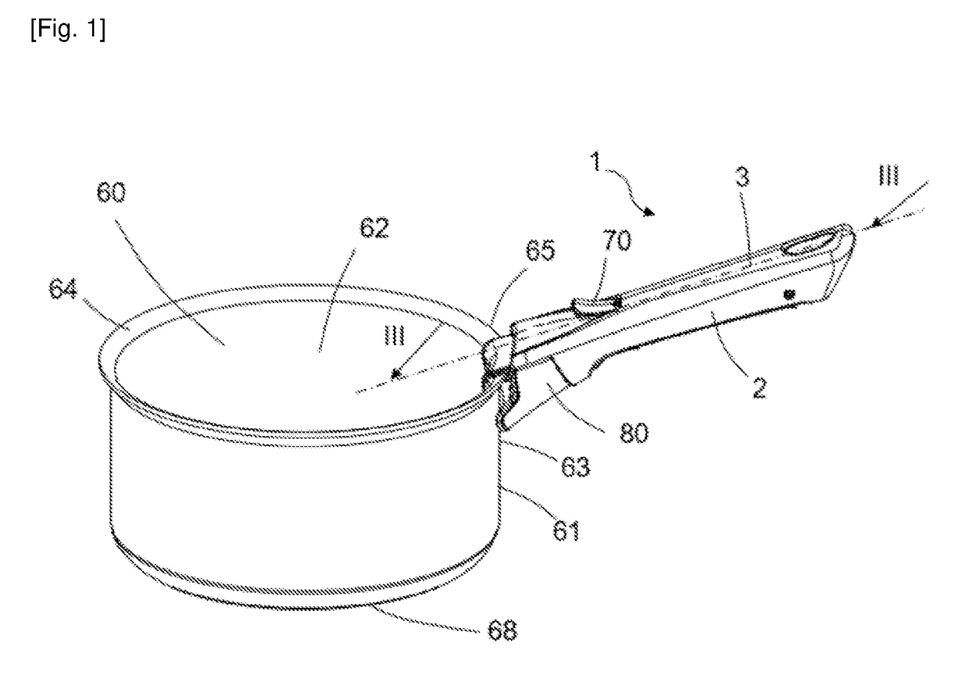
FIG. 1 is a perspective view of a removable handle fitted to a cooking container according to a particular embodiment of the invention, the lock being in the closed position.
Figure 2:
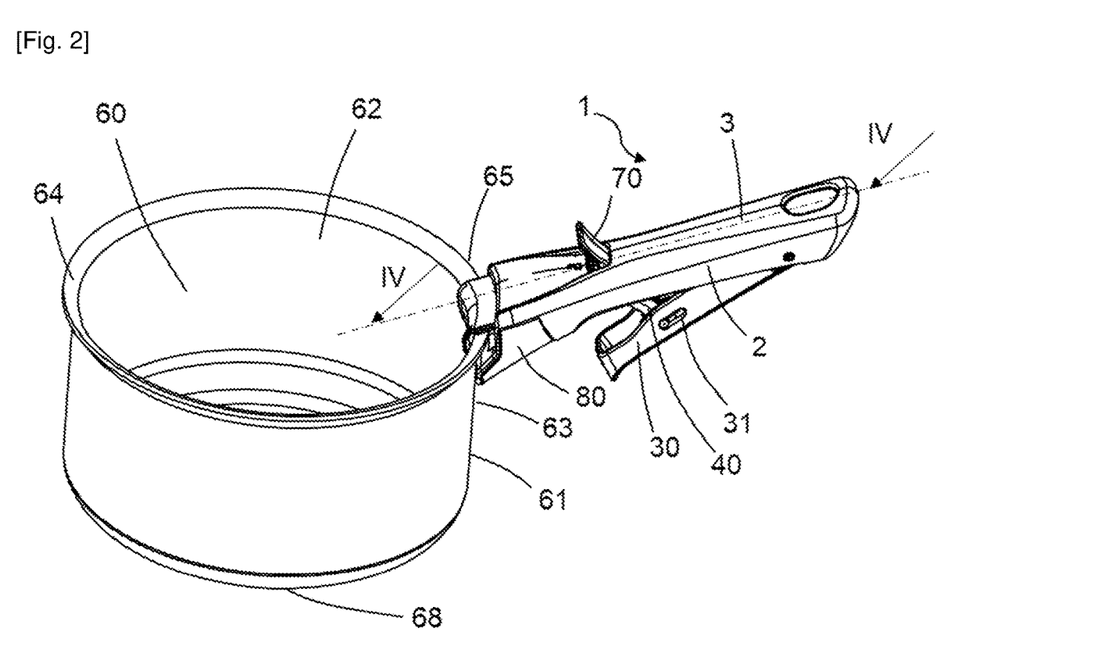
FIG. 2 is a perspective view of the removable handle arranged on a cooking container of FIG. 1, the lock being in the open position.
Figure 3:
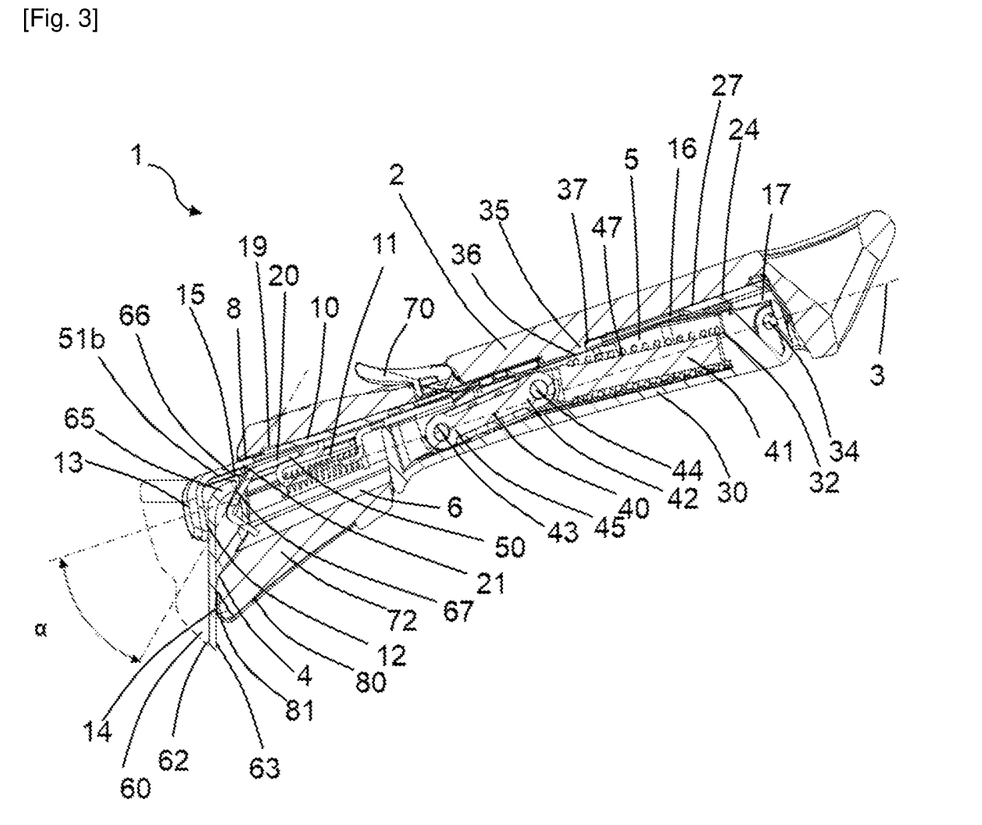
FIG. 3 illustrates a cross-sectional view of the removable handle along the median vertical sectional plane III-III of FIG. 1.
Figure 4:
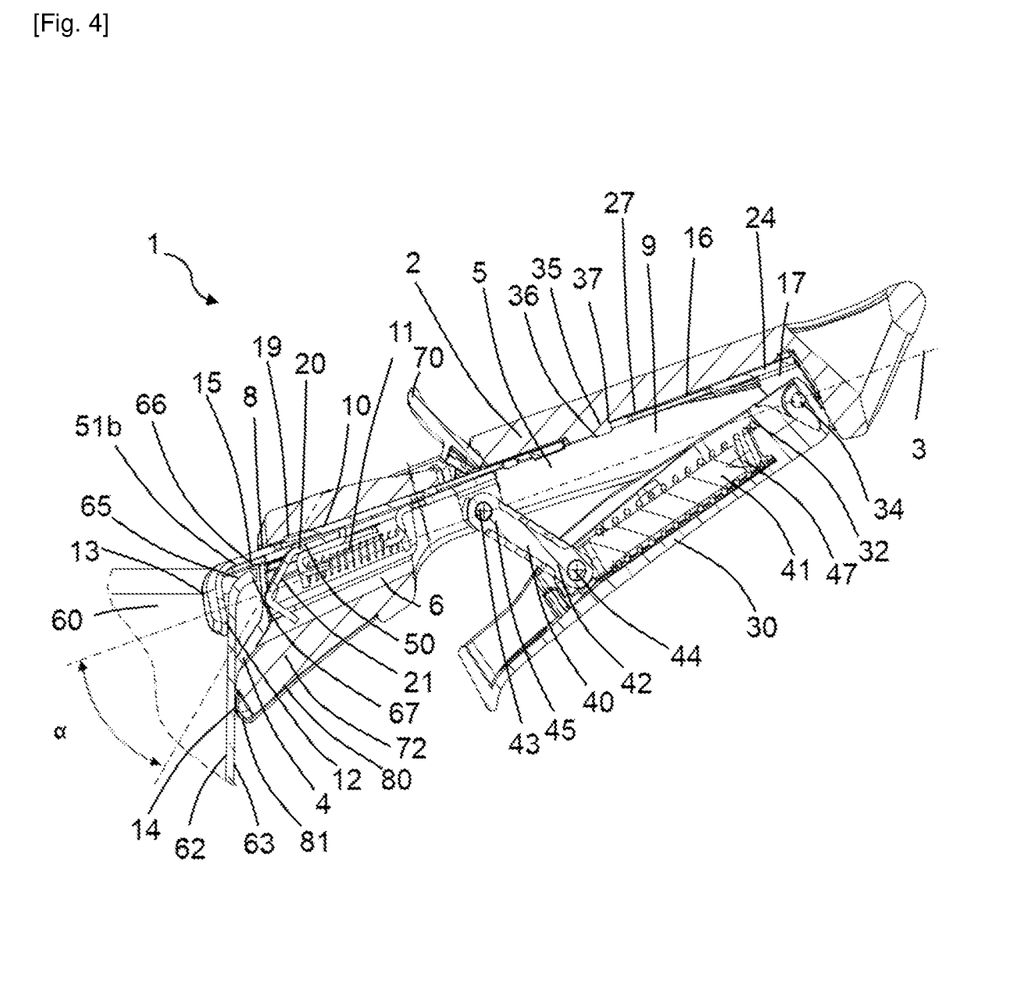
FIG. 4 illustrates a cross-sectional view of the removable handle along the median vertical sectional plane Iv-Iv of FIG. 2.

As can be seen in FIGS. 1 to 5, a removable handle 1 is designed to cooperate with a cooking container 60 which comprises a horizontal bottom wall 68, a side wall 61 rising from the bottom wall 68, and an outwardly-curved portion 64. The side wall 61 comprises an interior surface 62 and an exterior surface 63. The curved portion 64 extends the side wall 61 and delimits the upper opening of the cooking container 60. The curved portion 64 comprises a free end 65 with an upper edge 66 and a lower edge 67 (FIGS. 3 and 4). The upper edge 66 and lower edge 67 are preferably superimposed in a vertical plane.

The removable handle 1 extends in a longitudinal direction 3. The removable handle 1 comprises a gripping body 2 which comprises, at a front end 72 oriented towards the cooking container 60, a front face 4 having an outer supporting member 14 designed to cooperate with the exterior surface 63 of the side wall 61. In one vertical sectional plane oriented in the longitudinal direction 3 (FIGS. 3 and 4), the outer supporting member 14 is substantially vertical. The removable handle 1 comprises a median vertical plane that extends along the longitudinal direction 3 and which forms a plane of symmetry for the removable handle 1.

Figure 5:
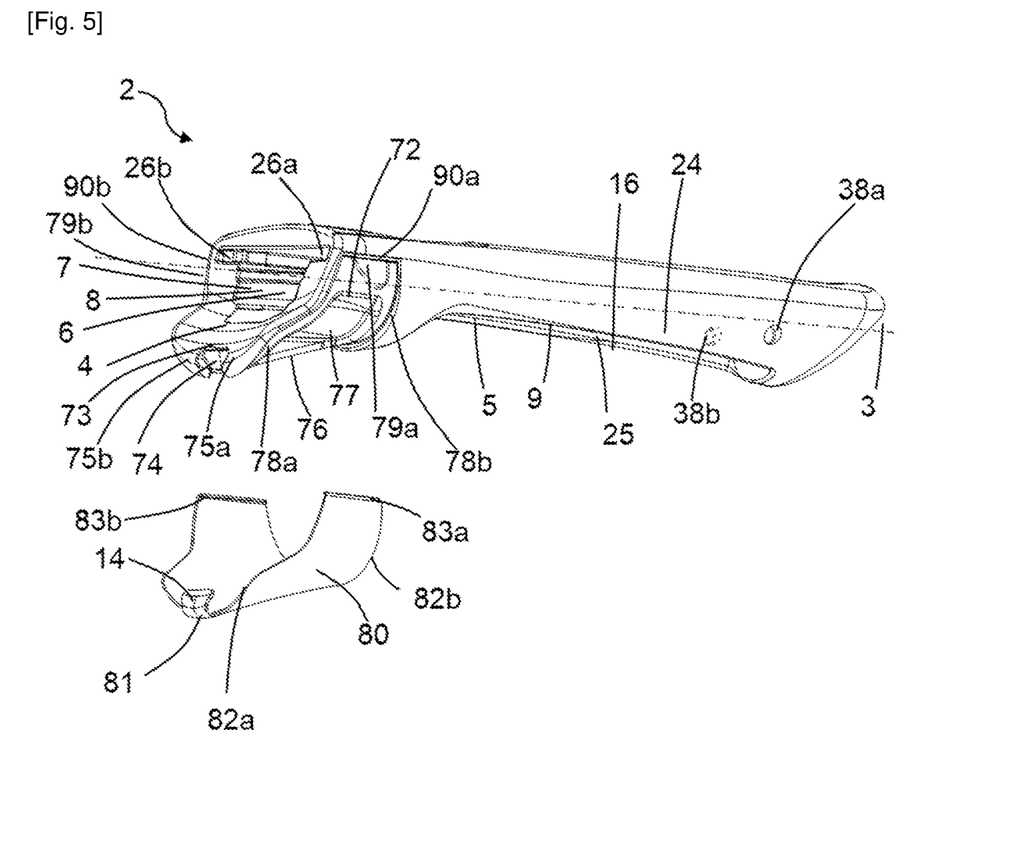
FIG. 5 is a perspective view of the gripping body of the removable handle illustrated in FIG. 1.

As can be seen in FIG. 5, the gripping body 2 extends along the longitudinal direction 3. The gripping body 2 is made of a plastic material. Preferably, the plastic material is of the thermosetting type, in particular a phenol-formaldehyde resin. The gripping body 2 comprises a metal reinforcement 80 attached to the front end 72. The metal reinforcement 80 is provided with a tab 81 that extends at the support member 14. The front face 4 of the front end 72 comprises a lower portion 73. The lower portion 73 of the front face 4 comprises a cavity 74 for receiving the tab 81. The lower portion 73 of the front face 4 comprises two support zones 75a, 75b arranged on either side of the cavity 74. The support zone 75a and the support zone 75b are arranged symmetrically in relation to the plane of symmetry of the removable handle 1. The tab 81 and the two support zones 75a, 75b form the external support member 14. Advantageously, the tab 81 and the two support zones 75a, 75b are aligned to be in simultaneous contact with the exterior surface 63 of the side wall 61 of the cooking container 60. In one embodiment variant, the tab 81 and the two support zones 75a, 75b are offset by a few tenths of a millimeter to promote contact between the two support zones 75a, 75b with the exterior surface 63 of the side wall 61 of the cooking container 60. The tab 81 comes into contact with the exterior surface 63 of the side wall 61 only when the two support zones 75a, 75b are worn or thermally degraded.

The front end 72 of the gripping body 2 comprises a lower outer face 76. The metal reinforcement 80 extends over almost the entire lower outer face 76 to form a flame guard. The front end 72 comprises a housing 77 in which the metal reinforcement 80 is embedded. The housing 77 comprises a front shoulder 78a and a rear shoulder 78b. The metal reinforcement 80 comprises a front edge 82a which is arranged in the front shoulder 78a and a rear edge 82b which is arranged in the rear shoulder 78b. The cavity 74 receiving the tab 81 is connected to the housing 77. The tab 81 extends from the front edge 82a of the metal reinforcement 80 forward then upward, along the front face 4.

The lower outer face 76 of the front end 72 of the gripping body 2 comprises first and second upper ends 79a, 79b arranged on either side of the plane of symmetry of the removable handle 1. The metal reinforcement 80 comprises first and second fasteners 83a, 83b arranged at the first and second upper ends 79a, 79b. The first and second fasteners are formed by first and second material returns 83a, 83b that extend along the longitudinal direction 3 and towards the inside of the gripping body 2. The first and second upper ends 79a, 79b comprise first and second receiving housings 90a, 90b of the first and second material returns 83a, 83b. The first and second material returns 83a, 83b are arranged in the first and second receiving housings 90a, 90b by elastic deformation of the metal reinforcement 80. The metal reinforcement 80 is made from stainless steel sheet having a thickness equal to 0.6 millimeters.

According to FIGS. 3, 4, 6 and 7, removable handle 1 has a clip 50 made of metal material. The clip 50 comprises two tabs (51a, 51b) arranged on either side of a vertical median plane. The two tabs 51a, 51b form an upper supporting member 15 designed to cooperate with the upper edge 66 of the free end 65 (FIG. 3). The two tabs 51a, 51b extend along the longitudinal direction 3, at the front end.

The removable handle 1 comprises a structural part 10 which is made of metal material. The structural part 10 is substantially flat and comprises an end tab 13. The end tab 13 extends downwards and comprises an inner wall forming an inner supporting member 12 designed to cooperate with the interior surface 62 of the side wall 61.

The inner supporting member 12 and the outer supporting member 14 are offset in the longitudinal direction 3 (FIG. 3) to enable the insertion of the side wall 61 and the free end 65 during the assembly of the removable handle 1 on the cooking container 60.

The removable handle 1 comprises a locking member formed by a lock 20 movable in translation along the longitudinal direction 3 between an open position (FIG. 4) and a closed position (FIG. 3). One front end of the lock 20 comprises a blocking wall 21. As can be seen in FIG. 4, in the open position of the lock 20, the blocking wall 21 is intended to be separated from the upper support member 15 to enable the insertion of the side wall 61 between the internal and external support members 12 and 14 and to allow the upper edge 66 of the free end 65 to come against the upper support member 15.

As can be seen in FIG. 3, when the lock 20 is in the closed position, the blocking wall 21 is designed to rest against the lower edge 67 of the free end 65 and thus to block the upper edge 66 against the upper supporting member 15. In a vertical sectional plane comprising the longitudinal direction 3, a straight line on the blocking wall 21 and the longitudinal direction form an angle $\alpha$ comprised between 40 and 50°, preferably 45°.

Figure 6:
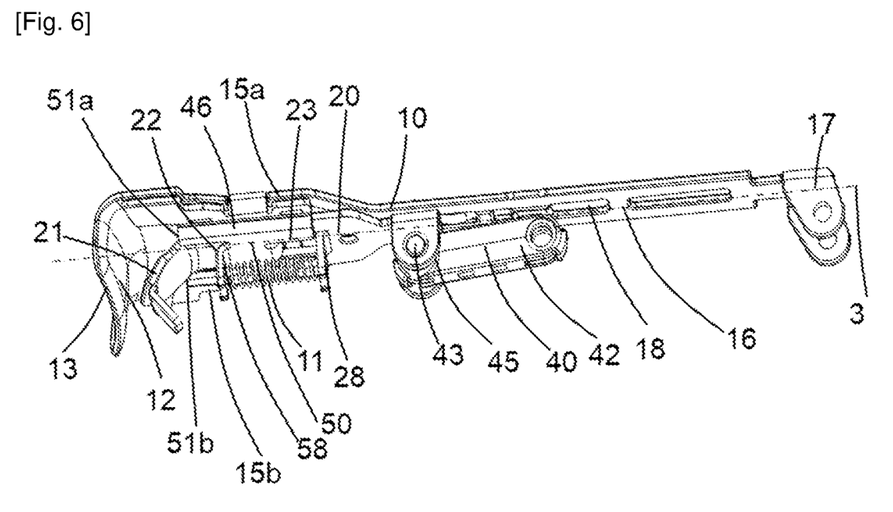
FIG. 6 is a perspective view of the bottom of the sub-assembly formed by the structural part, the clip, the lock and the connecting rod of the removable handle illustrated in FIG. 1.

As can be seen in FIG. 6, the removable handle 1 comprises a return means of the lock 20 placed between a tab 58 borne by the clip 50 and a stop 28 borne by the lock 20. The return means is formed by a spring 11. The spring 11 works in compression when the lock 20 is in the closed position. The spring 11 is adapted to apply a return force on the stop 28 to pull the lock 20 to its open position.

According to FIGS. 3 and 4, the removable handle 1 comprises means of moving the locking body formed by the lock 20. The means of movement comprise a lever 30 which is pivotally mounted on the structural part 10 and the gripping body 2 around a pivot pin 34 extending in a transverse direction, perpendicular to the longitudinal direction 3, and a connecting rod 40 which enables the movement of the lock 20 when the lever 30 is pivoted. The connecting rod 40 is pivotally mounted, by a first end 45, to the lock 20 around a pin 43, and by a second end 42 to the lever 30 around a pin 44 which is slidably mounted in an oblong opening 31 made in the lever 30 (FIG. 2).

The lever 30 is movable between a closed position and an open position after moving through an intermediate position of unstable balance. When the lever 30 is in the closed position, the lock 20 is in the closed position and when the lever 30 is in the open position, the lock 20 is in the open position. In addition, the means of movement also comprise a spring 47 which is disposed on a rod 41. The pin 44 is inserted into the rod 41 and into the oblong opening 31. The spring 47 is slidably mounted on the rod 41 and supported on a transverse wall 32 of the lever 30. This compression spring 47 pushes back the pin 44 via the rod 41 to enable an adjustment of the position of the lock 20 in a closed position to the thickness of the side wall 61 of the cooking container 60.

According to FIG. 3, when the lever 30 is in the closed position, the pin 44 around which the second end 42 pivots is located above a line passing through the pivoting pin 34 and the pin 43. The second end 42 is held in contact with the structural part 10 under the action of the compression spring 47. Thus, the lock 20 naturally stays in its closed position, without the user having to maintain any force on the removable handle 1. The intermediate position with unstable balance of the lever 30 is reached when the pin 44 around which the second end 42 pivots is moved under the line passing through the pivoting pin 34 and the pin 43.

Figure 7:
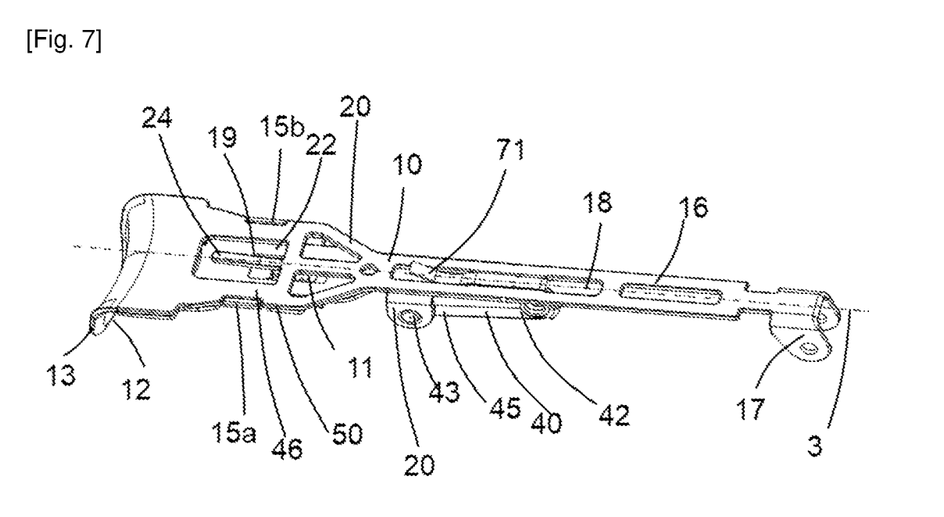
FIG. 7 is a perspective view of the top of the sub-assembly illustrated in FIG. 6.

As can be seen in FIGS. 6 and 7, the structural part 10, the clip 50 and the lock 20 form a sub-assembly. The lock 20 comprises a substantially flat central portion 22 that extends along the longitudinal direction 3. The clip 50 covers the central portion 22 of the lock 20 and is attached to the structural part 10 by laser welding. The clip 50 and the structural part 10 form a housing 23 for receiving and guiding the lock 20 in translation. The sub-assembly also comprises the spring 11, the connecting rod 40 and the pin 43.

The structural part 10 equipped with the clip 50 comprises a part 46 equipped with two lateral wings 15*a*, 15*b* (FIG. 7) arranged near the end tab 13. The structural part 10 comprises a part taking the shape of a lamina 16 which extends along the longitudinal direction 3 from the part 46 provided with the two lateral wings 15*a*, 15*b* up to a rear end which comprises an inverted U-shaped yoke 17. The lamina 16 comprises a through opening 18, arranged near the rear end. The structural part 10 comprises a tab 19 (FIG. 7) provided with a free end 24 deformed upwards, transversely in the longitudinal direction 3.

As can be seen in FIG. 5, the gripping body 2 comprises a receiving housing 5 of the sub-assembly. The housing 5 comprises a tubular portion 6 which extends along the longitudinal direction 3 and includes a free end 7 which opens on the front face 4 to form an insertion orifice 8. The insertion orifice 8 is arranged above the external support member 14. The housing 5 comprises an inverted U-shaped portion 9, which extends along the longitudinal direction 3 in the extension of the tubular portion 6. The inverted U-shaped portion 9 comprises a lower opening 25 for inserting and receiving the lever 30. The housing 5 in the tubular portion 6 comprises two upper lateral grooves 26*a*, 26*b* which extend along the longitudinal direction 3. The two lateral wings 15*a*, 15*b* of the structural part 10 are intended to slide in the two grooves 26*a*, 26*b* when inserting the sub-assembly into the housing 5, more particularly into the tubular portion 6. The housing 5 has an upper face 27 provided with a lug 35 (FIGS. 3 and 4). The lug 35 is arranged in the inverted U-shaped portion 9. The lug 35 comprises an inclined face 36 intended to flex the lamina 16 elastically during assembly until the lug 35 enters the through opening 18 at the end of insertion. The lug 35 comprises a vertical face 37 that cooperates with the through opening 18 to prevent the extraction of the sub-assembly of the gripping body 2. The lamina 16 provided with the through opening 18 and the lug 35 form a self-locking device of the sub-assembly in the gripping body 2. The lever 30 is assembled by inserting in a transverse direction, perpendicular to the longitudinal direction 3, the pin 34 into two perforations 38*a*, 38*b* (FIG. 5) of the gripping body 2, into the yoke 17 and the lever 30. Such an assembly ensures the maintenance in position of the lug 35 in the through opening 18.

As can be seen in FIGS. 1 to 4, the removable handle 1 comprises an opening button 70 that enables the lever 30 to be moved from its initial closing position to beyond its intermediate position with unstable balance. The opening button 70 is arranged on an upper face of the gripping body 2. The opening button 70 can be turned around a transverse pin, horizontal to the longitudinal direction 3 of the removable handle 1. The opening button 70 is movable between a lowered resting position in which the lever 30 is in its closed position, an intermediate raised position in which the lever 30 is in its intermediate position in which balance is unstable, and a raised position in which the lever 30 is in its open position. A holding spring 71 (FIG. 7) of the opening button 70 in its raised position is arranged on the structural part 10.

In operation, to assemble the removable handle 1 on the cooking container 60, the user grasps the gripping body 2 and moves the lock 20 into its open position. To do this, he uses his thumb to pivot the opening button 17 from the lowered resting position in which the lever 30 is in its closed position to the raised position in which the lever 30 is in its open position. The movement of the lever 30 from its closed position to its open position causes the movement of the lock 20 from its closed position to its open position by means of the connecting rod 40. The user then inserts the free end 65 of the curved portion 64 between the internal support member 12 and the external support member 14 to bring the interior surface 62 of the side wall 61 against the internal support member 12 and the exterior surface 63 against the external support member 14, and also to bring the upper edge 66 against the two tabs 51*a*, 51*b*. Then, the user presses on the lever 30 to move it from its open position to its closed position and thus moves the lock 20 from its open position to its closed position. The blocking wall 21 then rests against the lower edge 67 of the free end 65 and thus locks the upper edge 66 against the two tabs 51*a*, 51*b*. The tab 81 of the metal reinforcement 80 and the two support zones 75*a*, 75*b* which form the external support member 14 are in contact with the exterior surface 63 of the side wall 61 of the cooking container 60. In the event of thermal degradation of the front end 72 of the gripping body 2, in particular of the two support zones 75*a*, 75*b*, the tab 81 itself forms the external support member 14 to preserve the geometry of the removable handle/cooking container assembly.

Figure 8:
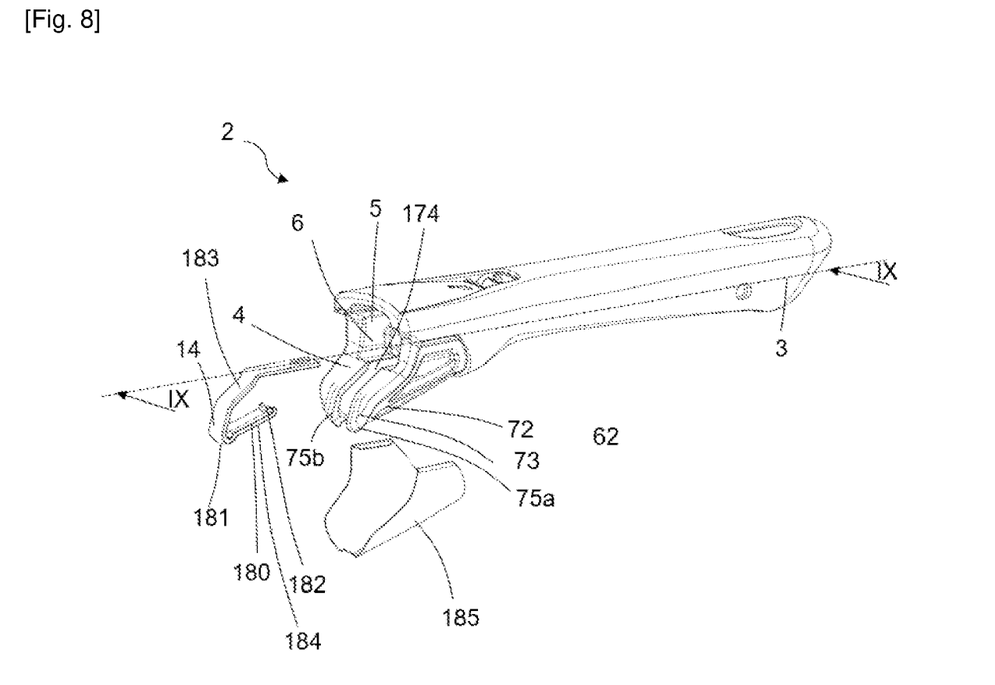
FIG. 8 is a perspective view of the gripping body of a variant of embodiment of the removable handle illustrated in FIG. 1.
Figure 9:
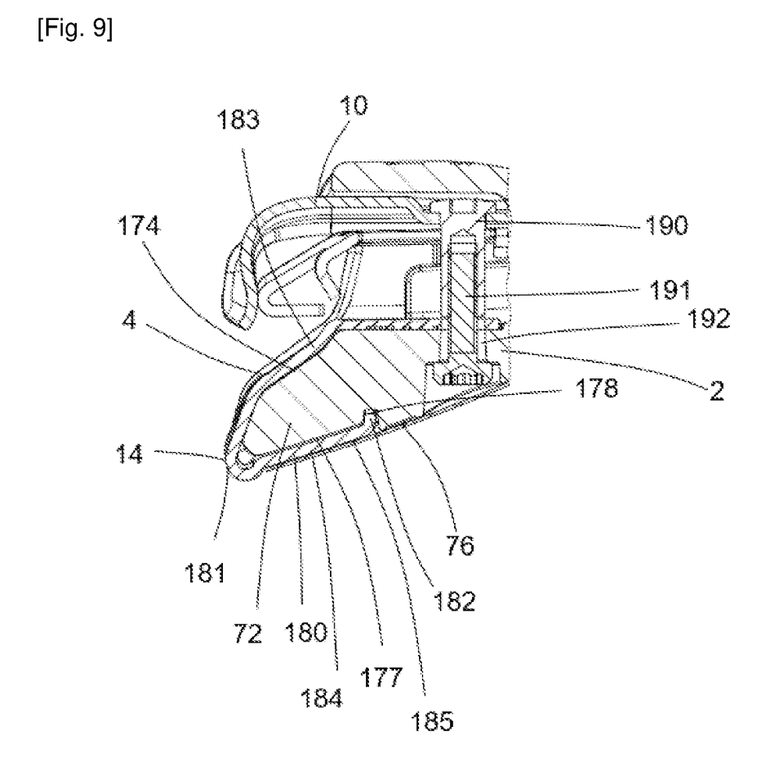
FIG. 9 illustrates a cross-sectional view of the removable handle along the median vertical sectional plane IX-IX of FIG. 8.

In an alternative embodiment illustrated in FIGS. 8 and 9, the gripping body 2 comprises a metal reinforcement 180 attached to the front end 72. The metal reinforcement 180 is provided with a tab 181 that extends at the support member 14. The front face 4 of the front end 72 comprises a cavity 174 which extends into the tubular portion 6 of the housing 5, along the longitudinal direction 3. The cavity 174 forms a receiving housing of the tab 181 and a first portion 183 of the metal reinforcement 180. The lower portion 73 of the front face 4 comprises two support zones 75*a*, 75*b* arranged on either side of the cavity 174. The support zone 75*a* and the support zone 75*b* are arranged symmetrically in relation to the symmetry of plane of the removable handle 1. The tab 181 and the two support zones 75*a*, 75*b* form the external support member 14. Preferably, the tab 181 only comes into contact with the exterior surface 63 of the side wall 61 when the two support zones 75*a*, 75*b* are worn or thermally degraded. The metal reinforcement 180 extends over the lower outer face 76. The front end 72 comprises a housing 177 (FIG. 9) in which a second portion 184 of the metal reinforcement 180 is embedded. The housing 177 has a cavity 178. The metal reinforcement 180 comprises a material return 182 which is arranged in the cavity 178. The metal reinforcement 180 thus surrounds the front end 72. The metal reinforcement is assembled on the front end 72 by elastic deformation, in particular the second portion 184 which extends over the lower outer face 76 and which comprises the material return 182.

As can be seen in FIG. 9, the structural part 10 comprises a cylindrical slug 190 equipped with threading intended to cooperate with a screw 191. The front end 72 comprises a hole 192 for the screw 191. The second portion 184 of the metal reinforcement 180 is completely immobilized on the front end 72 by tightening the screw 191 in the threading of the cylindrical slug 190.

In this embodiment, the gripping body 2 comprises a flame guard 185 which is separated from the metal reinforcement 180.

Of course, the invention is in no way limited to the embodiment described and illustrated, since this embodiment was only provided by way of example. Changes can still be made, particularly with regard to the constitution of the various elements or by substituting technical equivalents, without departing from the scope of protection of the invention.

Thus, in a first variant of embodiment, the gripping body 2 comprises a stiffening part arranged behind the metal reinforcement 80 at the tab 81. The stiffening part extends along the longitudinal direction 3 and can be attached to the metal reinforcement or to the front end 72. The stiffening part is made of a flame-resistant material and allows the geometry of tab 81 to be maintained.

Thus, in a second variant of embodiment, the metal reinforcement 80 is attached to the gripping body 2 by screwing. The first and second fasteners are formed by first and second tabs, each equipped with a perforation for passing a screw and the first and second upper ends 79a, 79b comprise first and second receiving housings of the first and second tabs. The two screws place the first and second tabs on the gripping body by screwing directly into the gripping body 2 or into the structural part 10.

The invention claimed is:

1. A removable handle configured to cooperate with a cooking container having a side wall that is extended upward by an outwardly curved portion comprising a free end, said removable handle extending in a longitudinal direction and comprising:
    an internal support member and an external support member (14) configured to come against, respectively, an interior surface and an exterior surface of the side wall;
    a plastic gripping body which extends longitudinally and which comprises a front end equipped with the external support member, wherein the plastic gripping body comprises a metal reinforcement attached to the front end of the gripping body and having with a tab that extends at the support member and wherein the metal reinforcement extends over a lower outer face of the front end of the plastic gripping body, the metal reinforcement and the tab dimensioned to maintain the geometry of the removable handle/cooking container assembly in an event of thermal degradation of a plastic material of the front end of the plastic gripping body.

2. The removable handle according to claim 1, wherein the front end of the plastic gripping body comprises a front face equipped with a lower portion and wherein the lower portion of the front face comprises a cavity for receiving the tab.

3. The removable handle according to claim 1, wherein the metal reinforcement comprises a vertical plane of symmetry passing through the longitudinal direction, the tab extending on either side of the plane of symmetry.

4. The removable handle according to claim 1, wherein the metal reinforcement is made from a sheet having a thickness greater than 0.6 millimeters.

5. The removable handle according to claim 1, wherein the lower outer face of the front end of the plastic gripping body comprises first and second upper ends and wherein the metal reinforcement comprises first and second fasteners arranged at the first and second upper ends.

6. The removable handle according to claim 5, wherein the first and second fasteners are formed by first and second material returns that extend along the longitudinal direction and towards an inside of the plastic gripping body and wherein the first and second upper ends comprise first and second receiving housings of the first and second material returns.

7. The removable handle according to claim 6, wherein the first and second material returns are arranged in the first and second receiving housings by elastic deformation of the metal reinforcement.

8. The removable handle according to claim 1, wherein the metal reinforcement covers a portion of the lower outer face of the front end of the plastic gripping body to form a flame guard.

9. The removable handle according to claim 1, wherein the metal reinforcement surrounds the front end of the plastic gripping body.

10. The removable handle according to claim 9, wherein the tab is arranged between a first portion and a second portion of the metal reinforcement.

11. The removable handle according to claim 10, wherein the first portion is immobilized on the plastic gripping body by screwing and wherein the second portion comprises a material return embedded in a cavity of the plastic gripping body.

12. The removable handle according to claim 1, further comprising:
    a structural part comprising the internal support member and an upper support member configured to come against the free end of the curved portion; and
    a lock movable in translation between an open position and a closed position, the lock comprising a blocking wall configured to be separated from the internal support member in the open position of the lock and configured to generate a force on the free end in the closed position of the lock, under the action of a pressurizing means.

13. The removable handle according to claim 12, further comprising a means of maneuvering the lock comprising a lever movably mounted in rotation on the structural part and on the plastic gripping body, a connecting rod and a compression spring forming the pressurizing means.

14. An assembly formed by at least one cooking container comprising a side wall which extends upwards by an outwardly-curved portion comprising a free end with an upper edge and a lower edge and a removable handle according to claim 1.

* * * * *